US011849889B2

(12) United States Patent
Qu et al.

(10) Patent No.: US 11,849,889 B2
(45) Date of Patent: Dec. 26, 2023

(54) AEROTHERMODYNAMIC ENVIRONMENT-FRIENDLY TOILET, MOUNTING METHOD, AND APPLICATION OF AEROTHERMODYNAMIC ENVIRONMENT-FRIENDLY TOILET

(71) Applicant: CHINA ACADEMY OF AEROSPACE AERODYNAMICS, Beijing (CN)

(72) Inventors: Wei Qu, Beijing (CN); Bangcheng Ai, Beijing (CN); Jijun Yu, Beijing (CN)

(73) Assignee: CHINA ACADEMY OF AEROSPACE AERODYNAMICS, Beijing (CN)

( * ) Notice: Subject to any disclaimer, the term of this patent is extended or adjusted under 35 U.S.C. 154(b) by 125 days.

(21) Appl. No.: 17/606,465

(22) PCT Filed: Nov. 22, 2019

(86) PCT No.: PCT/CN2019/120171
§ 371 (c)(1),
(2) Date: Oct. 26, 2021

(87) PCT Pub. No.: WO2020/220653
PCT Pub. Date: Nov. 5, 2020

(65) Prior Publication Data
US 2022/0192442 A1 Jun. 23, 2022

(30) Foreign Application Priority Data

Apr. 28, 2019 (CN) .......................... 201910351820.8

(51) Int. Cl.
*A47K 11/02* (2006.01)
*E03D 5/014* (2006.01)

(52) U.S. Cl.
CPC .............. *A47K 11/02* (2013.01); *E03D 5/014* (2013.01)

(58) Field of Classification Search
CPC ........ A47K 11/02; A47K 11/023; E03D 5/014
See application file for complete search history.

(56) References Cited

U.S. PATENT DOCUMENTS 3,725,963 A * 4/1973 Speer .................... A47K 11/023
4/111.4
3,837,012 A * 9/1974 Rassbach ................ A47K 11/02
4/111.3
(Continued)

FOREIGN PATENT DOCUMENTS

CN 201414748 Y 3/2010
CN 102836866 A 12/2012
(Continued)

*Primary Examiner* — Janie M Loeppke
(74) *Attorney, Agent, or Firm* — Yu Gang (57) ABSTRACT

The present disclosure relates to an aerothermodynamic environment-friendly toilet, a mounting method, and an application of the aerothermodynamic environment-friendly toilet. The toilet includes a receiver, a processor, a solid storage device, a liquid storage device and a drying device. The toilet is odorless by using an aerothermodynamics principle. When no one uses the toilet, a fan at an exhaust port is used for exhausting a small amount of air from each cavity of the toilet to control an odor source unidirectionally; after use of the toilet, a waste treatment button is triggered, then hot air flow moves downwards, which downwards ejects air at an upper portion of a lower conical port of a reception guider of the receiver.

19 Claims, 6 Drawing Sheets

(56) References Cited

U.S. PATENT DOCUMENTS

| | | | | |
|---|---|---|---|---|
| 4,122,557 A | * | 10/1978 | Harris | A47K 11/023 |
| | | | | 4/111.3 |
| 5,123,122 A | * | 6/1992 | Blankenship | A47K 11/023 |
| | | | | 4/111.5 |
| 5,400,443 A | * | 3/1995 | Marino | E03D 11/11 |
| | | | | 4/300 |
| 9,265,387 B2 | * | 2/2016 | Takizawa | A47K 11/023 |

FOREIGN PATENT DOCUMENTS

| | | |
|---|---|---|
| CN | 107802200 A | 3/2018 |
| CN | 109965762 A | 7/2019 |
| JP | 2017077448 A | 4/2017 |

\* cited by examiner

AEROTHERMODYNAMIC ENVIRONMENT-FRIENDLY TOILET, MOUNTING METHOD, AND APPLICATION OF AEROTHERMODYNAMIC ENVIRONMENT-FRIENDLY TOILET

CROSS-REFERENCE TO RELATED APPLICATION

The disclosure claims the priority of Chinese Patent Application No. 201910351820.8, filed to the Chinese Patent Office on Apr. 28, 2019 and entitled "Aerothermodynamic Environment-Friendly Toilet, Mounting Method, and Application of Aerothermodynamic Environment-Friendly Toilet", which is incorporated in its entirety herein by reference.

TECHNICAL FIELD

The present disclosure relates to an aerothermodynamic environment-friendly toilet, a mounting method, and an application of aerothermodynamic environment-friendly toilet, and belongs to a technical field of environmental protection and energy conservation.

BACKGROUND

"Waterless toilet" on the market at present is a toilet without a water tank. The working principle of this kind of waterless toilet is: it can intelligently distinguish the amount of excreta in its bowl based on urban tap water pressure and the principle of hydrodynamics, and selects a corresponding flush volume for flushing reasonably, so that the amount of flush volume and flush kinetic energy can be ingeniously matched, which saves at least half of water. Essentially, it does not truly avoid water use. It is more reasonable to call the "waterless toilet" a water-saving toilet.

In rural and remote areas, a large number of outhouses are still widespread, which are called latrines or latrine pits. Except for convenient construction, these outhouses do not have any merit: they have soil pollution, groundwater pollution, difficult waste disposal and poor toilet use feeling. Infrastructures may be incomplete for upgrading these toilets. However, it will be costly to build a normal water toilet which requires supporting water pipes and sewer pipes to be laid. In addition, since the remote areas also face water deficiency, it is difficult to popularize the water-saving toilet.

Since early space flights were short, astronauts had to take sufficient disposable excreta collection bags. The "bag method" is used to collect excreta with the collection bags. Bag openings of the collection bags have elastic cords, and the elastic cords are opened to be fixed at the opening end of a toilet in use. A series of small holes are formed in the bottom of the inner wall of the inner cylinder of a toilet. During use, the air is pumped by a pumping pipe connected with an outer cylinder to form certain negative pressure. The bag opening is automatically tightened when the collection bag is removed after use. The collection bag containing excreta is put in an outer packaging bag before put into a special waste box.

In *Manned Spacecraft Technology* (Qi Faren, National Defense Industry Press, 1999), FIGS. 5-15 in P134 show schematic diagrams of an internal structure of a space shuttle combined toilet that uses a receiver in a two-way structure, one of which is for air, urine and flush water, and the other is for air flow and solid waste. With extremely complex structures specially designed for space microgravity in many aspects, the combined toilet is not suitable for the ground. For example, (a) a solid-state receiver uses an ellipsoidal structure, which is complicated to manufacture and high in cost. (b) A lower portion of the center uses a motor-driven thrower mechanism, and a series of blades hinged to the thrower to be spread outwards, cut up the solid waste and deposit it into an interlayer, with a complex structure, on the inner wall of the toilet. A rotary disc is hinged to the blades on the thrower, which is complicated to manufacture. In the figures, the hinged blades use needle-knives which are hinged to be like a parallelogram, and use hooked ends which are not conducive to cutting and discharging of viscous solid waste at a low motor ground speed. The rotary disc have straight edges. If the rotary disc does not rotate and liquid waste reaches the edge, the liquid waste will flow inwards to a motor shaft.

In an environment-friendly waterless toilet (CN107802200A), a receiver structure with a liquid buffer tank and a solid processing barrel is used, inside which an electric motor rotary cutting and crushing device is mounted. Without an odor eradication device, it is stated in the patent that a non-return valve or one-way valve can effectively prevent occurrence of flow-back of odor, which can only prevent "flow-back of odor" but cannot achieve "no odor". (b) A cavity structure is complicated in shape, with excessive inner and outer sleeves of the same cross section, and excessive cavities (such as cavities 3, 4, 13, 14, 15 and 16), and the wall surfaces of the cavities in shape from a column, a cone and an irregular curve surface. (c) The solid processing barrel is wound in electric heating wires for drying and heating on an outer side surface, which has large thermal inertia, a heat capacity of a wall of the barrel needs to absorb a large amount of heat first, solid waste merely is heated through heat conduction, solid waste in contact with the inner wall of the barrel accounts for a small proportion in area after all, and consequently, the heating and drying efficiency of the solid waste is low. (d) A vertical connection plate is arranged between an outer separation barrel and an inner separation disc, which is complicated in structure, difficult to weld and costly. (e) Besides the electric motor cutting device, a solid discharge pump is further arranged. The solid discharge pump accounts for a relatively large cost. And its inlet and outlet interfaces need certain space and interface design, which further increases complexity and cost. (f) A temperature sensor and a humidity sensor are used to control start and stop of a heating device and a crushing electric motor according to measured temperature and humidity and corresponding preset thresholds, causing complex control, poor reliability, and poor convenience due to the requirement for presetting a threshold again when environmental temperatures change. (g) It is only suitable for seat toilets instead of squat ones. (h) The toilet can only dry and treat waste, and further needs a storage device for solid waste and liquid waste outside. (i) Disassembly and assembly are difficult, and the maintenance cost is high.

A waterless toilet (CN104127151 B) uses a urine treatment system, an excreta crushing portion and a drying portion. It has the following defects: (a) it consumes plenty of heat and electricity to evaporate liquid in urine and excreta at a high temperature since water accounts for a majority of the urine. (b) Crushing and conveying devices are too complex, difficult to manufacture and high in cost. For example, a crushing chamber includes a crushing cavity, a shaft and an electric motor, and the conveying device includes a conveying cavity, a first worm gear, a second worm gear, a second transmission shaft, a third transmission shaft and a conveying electric motor. (c) An infrared sensor and a data processor are used to sense a distance between a human body and the toilet, which is only suitable for high-grade seat toilets and has high cost. (d) A negative ion sodium hypochlorite generator is used to treat bacteria, requiring regular adding of chemical liquids. On the one hand, waste production has the result of chemical addition, and on the other hand, many maintenance steps and high maintenance cost are caused. (e) A driving electric motor and a drying electric motor are used for the aspect of driving. Since the cost of electric motor accounts for a considerable proportion of manufacturing cost, one more electric motor will increase the cost. (f) Numerous gears and worm gears are arranged, resulting in sharp cost increase due to their machining complexity, high requirements for precision as well as large quantities, for example, a drive gear 15, a rack 17, a second gear 28, a first gear 29, a drying gear 27, a grinding gear 38, an excreta discharging gear 40, a first worm gear 18, a second worm gear 19 a synchronous pulley 22, as well as corresponding shaft and supporting connections.

A device for rapidly decomposing and processing solid waste (CN1974967A) utilizes a method of vacuum and microwave drying processing to process solid waste into sterile odorless dry sheets. Through analysis below, (a) the vacuum method requires an extra vacuum device and a large investment consequently, and a vacuum chamber formed through pumping requires additional processing time which lags behind to a large extent. (b) Too many microwave magnetrons and processing chambers are arranged, for example, a plurality of magnetrons and lamps are arranged in at least three chambers. (c) A large number of pumps and electric motors are arranged as well, for example a solid-liquid separation pump 2, a screw pump 7, a sewage pump 8, a water pump 12, an electric motor 36 and a vacuum pump 22, causing high cost. (d) It is complex in structure, inconvenient in disassembly and assembly, and high in cleaning and maintenance cost.

In a waterless toilet (CN201414748Y), a hot air blower, a dehumidifier and a synchronous heater are used to process pure solid waste. Through analysis below, (a) the utility model is merely provided with a bed pan, but without an outlet and a storage device of liquid waste, which requires a toilet user to defecate instead of urinating since the system cannot dry urine entering the bed pan. It is unrealistic. (b) Solid waste protruding from the bed pan is scraped by a vertical sheet scraper horizontally moving, which is driven by an additional electric motor, so the structure is complicated and the cost is high. (c) Too many electrical appliances are arranged, for example the hot air blower 8, the dehumidifier 11, an exhaust fan 15, a large exhaust fan 18, a small exhaust fan 19, a heater 12 and an electric scraper 20 etc., which will inevitably lead to high cost. (d) Several interfaces, for example 2-3, are provided between an electric drive air duct and the outside.

SUMMARY

The objective of the present disclosure is to overcome the defects in the prior art, and to provide an aerothermodynamic environment-friendly toilet. The toilet is odorless by using an aerothermodynamics principle, such that a toilet user has good experience. Moreover, the toilet has a simple structure and low cost, and may dry and crush solid wastes and separate solid from liquid so as to generate solid residue, liquids and other organic fertilizers periodically. The toilet requires low construction or modification cost, is convenient to clean and maintain, and consumes little power. Except for a small amount of water for periodic cleaning, the toilet is definitely a water-free toilet.

Another objective of the present disclosure is to provide a mounting method for the aerothermodynamic environment-friendly toilet.

Yet another objective of the present disclosure is to provide a use of the aerothermodynamic environment-friendly toilet.

The above objective of the present disclosure is achieved mainly by the following technical solutions:

An aerothermodynamic environment-friendly toilet includes a receiver, a processor, a solid storage device, a liquid storage device and a drying device, where the receiver, the processor, the solid storage device and the liquid storage device are sequentially connected, a crushing mechanism is arranged in the processor, the drying device is in communication with the receiver, generated hot air flow enters the processor by the receiver, after use of the toilet by a user, excreta falls to the crushing mechanism in the processor by the receiver, liquid in the excreta directly passes through the solid storage device to enter the liquid storage device, solid in the excreta is dried by the hot air flow and crushed by the crushing mechanism and then enters the solid storage device, and hot air flow enters a hot air flow channel and is discharged outwards by an air outlet at a tail end of the hot air flow channel.

The aerothermodynamic environment-friendly toilet further includes an appliance connected with the receiver for use of the toilet by the user, where the appliance includes a squatting appliance or a sitting appliance.

In the aerothermodynamic environment-friendly toilet, the receiver is a cavity structure, a reception guider with an inner diameter gradually reduced from top to bottom is arranged in the cavity structure, the reception guider is used for receiving the excreta, and an annular porous plate is arranged between an outer wall of the reception guider and an inner wall of the cavity structure.

In the aerothermodynamic environment-friendly toilet, a longitudinal section of the reception guider is of trapezoidal, and a center line of the reception guider coincides with a center line of a centrifugal rotary disc in the crushing mechanism.

In the aerothermodynamic environment-friendly toilet, an outlet of the drying device is located on an upper portion of the annular porous plate, and the annular porous plate has throttling and guiding effects, such that hot air flow generated by the drying device flows downwards.

In the aerothermodynamic environment-friendly toilet, the crushing mechanism is arranged in the processor and includes an electric motor, a centrifugal rotary disc and a cutting member, the cutting member being arranged on the centrifugal rotary disc, a shaft of the centrifugal rotary disc is connected with the electric motor, the centrifugal rotary disc is located above the hot air flow channel, and a size of the centrifugal rotating disc is designed to at least completely cover an inlet of the hot air flow channel.

In the aerothermodynamic environment-friendly toilet, an annular baffle is arranged on an edge of the centrifugal rotary disc, and an included angle between a generatrix of the annular baffle and a plane of the centrifugal rotary disc is 30-150°.

In the aerothermodynamic environment-friendly toilet, the cutting member includes a cutting cutter and a wire cutter.

In the aerothermodynamic environment-friendly toilet, a first fixing rod is arranged between an inner wall of a cavity structure of the processor and an outer wall defining the hot air flow channel, a second fixing rod is arranged between the electric motor and an inner wall defining the hot air flow channel, and a third fixing rod is arranged between an inner wall of a cavity structure of the solid storage device and an outer wall of the hot air flow channel.

In the aerothermodynamic environment-friendly toilet, the solid storage device and the liquid storage device are of annular cavity structures matching in shape, and hot air flow channels are formed in the annular cavity structures and are in communication with a hot air flow channel formed in the processor, so as to form a complete hot air flow channel.

In the aerothermodynamic environment-friendly toilet, a through hole is provided in a bottom of an annular cavity of the solid storage device and configured to allow liquid to pass through, and a bottom of the annular cavity of the liquid storage device is a closed structure.

In the aerothermodynamic environment-friendly toilet, the drying device includes a fan, a hot air supply pipe and an air heater, the air heater being arranged in the hot air supply pipe, and the fan being in communication with the hot air supply pipe.

The aerothermodynamic environment-friendly toilet further includes a trigger button, wherein after use of the toilet by the user, the trigger button is pressed to start the drying device and the crushing mechanism to dry and crush solids in the excreta.

The aerothermodynamic environment-friendly toilet further includes a time relay, wherein the time relay is connected with the trigger button to achieve delay control.

The aerothermodynamic environment-friendly toilet further includes a locking device, where the locking device is configured to circumferentially lock and fix the receiver, the processor, the solid storage device and the liquid storage device that are mounted.

In the aerothermodynamic environment-friendly toilet, the locking device includes a locking rod and a plurality of fixing members, the plurality of fixing members being mounted on the receiver, the processor, the solid storage device and the liquid storage device respectively, and a fixing groove is provided in each of the plurality of fixing members and configured to match the locking rod to circumferentially lock the toilet.

In the aerothermodynamic environment-friendly toilet, the receiver is fixedly or movably connected with the processor, the processor is movably connected with the solid storage device, and the solid storage device is movably connected with the liquid storage device.

In the aerothermodynamic environment-friendly toilet, a movable connection device used includes a side lug and a fixing hook, and in two connected devices, the fixing hook of one device is connected with the side lug of the other device in a hooking mode.

In the aerothermodynamic environment-friendly toilet, end faces of the receiver, the processor, the solid storage device and the liquid storage device are connected with each other in a form of a flat interface, an outer-inner clamping interface, an inner-outer clamping interface, an outer-inner cone interface or an inner-outer cone interface.

In the aerothermodynamic environment-friendly toilet, the receiver, the processor, the solid storage device and the liquid storage device are integrally arranged on or under the ground.

In the aerothermodynamic environment-friendly toilet, the air outlet is in communication with an exhaust port by a pipeline, and an exhaust fan is mounted at an outlet of the exhaust port.

A mounting method for the aerothermodynamic environment-friendly toilet includes:
  connecting a receiver with an appliance for use of a toilet by a user, and sealing an interface;
  connecting a liquid storage device with an air outlet fixedly arranged;
  connecting a processor with the receiver;
  connecting a solid storage device with the processor;
  connecting the liquid storage device with the solid storage device; and
  using a locking device to lock and fix the receiver, the processor, the solid storage device and the liquid storage device that are mounted.

In the mounting method for the aerothermodynamic environment-friendly toilet, a mounting tool is used for connecting/disconnecting the liquid storage device with/from the fixed air outlet, the processor with/from the receiver, the solid storage device with/from the processor, and the liquid storage device with/from the solid storage device; and the mounting tool includes a rod body, a hoop and at least one handle, the hoop being arranged at one end of the rod body, the handle being arranged at the other end of the rod body and/or between the two ends, the hoop being of a cambered structure, each of two ends of the hoop being provided with an upwarping hook, the hoop matching a device body, and the upwarping hook matching a side lug of the device.

In the mounting method for the aerothermodynamic environment-friendly toilet, the rod body is a bent structure or a linear structure, the rod body is connected with the hoop by a connecting pair, and the connecting pair is of a T-shaped structure and used for fixing between the rod body and the hoop and increasing strength.

Further provided is a use of the aerothermodynamic environment-friendly toilet in rural and remote area toilets, space toilets, urban toilets, park toilets or scenic spot toilets.

Compared with the prior art, the present disclosure has the following beneficial effects:

(1) The aerothermodynamic environment-friendly toilet provided in the present disclosure consists of a receiver, a processor, a solid storage device, a liquid storage device and a drying device. The toilet is odorless by using an exhaust and aerothermodynamics principle, which not only may meet the requirement for good experience of the toilet user, but may generated the organic fertilizers such as solid residue, liquids, etc. periodically. In addition, the toilet requires low construction or modification cost, is convenient to clean and maintain, and consumes little power. Except for a small amount of water for periodic cleaning, the toilet is definitely a water-free toilet.

(2) The present disclosure may achieve the odorless toilet. When no one uses the toilet, a fan at an exhaust port is used for exhausting a small amount of air from each cavity of the toilet to control an odor source unidirectionally; and after use of the toilet, a waste treatment button is triggered, then hot air flow moves downwards, which ejects air at an upper portion of a lower conical port of a guider of the receiver, so as to control the odor source unidirectionally likewise, and a requirement for odorlessness is met.

(3) The toilet effectively separates solid wastes from liquid wastes, and after reaching a crushing mechanism, the liquid wastes naturally drop from an edge of the crushing mechanism, preferably naturally drop form a baffle of a rotary disc, pass through a solid storage device and enter a liquid storage device; and during solid waste treatment, the solid wastes are actively air-dried and chopped by hot air flow and separated to the solid storage device by centrifugal force, and the solid storage device and the liquid storage device are cleaned periodically, so as to effectively separate organic fertilizers such as solid residue, liquids, etc.

(4) A water-free toilet is truly achieved, and the toilet needs no water in normal use except for a small amount of water for long-time periodic cleaning and surface cleaning treatment.

(5) The power consumption is low, only the drying device, the crushing mechanism, etc. need to consume a small amount of power, energy is saved, and the cost is reduced;

(6) The toilet may be designed and constructed under the ground, and a support and containing space structure may also be constructed on the ground, the construction or reconstruction price is low, and the receiver and the processor are fixed relative to the ground during construction. The solid storage device and the liquid storage device are movable, convenient to collect, take out and put in again and convenient to clean and maintain, and a simple and effective sealing mode is used for connection between barrels of the receiver, the processor, the solid storage device and the liquid storage device, and disassembly is convenient.

(7) The toilet has a wide application range and may be applied to rural areas, remote areas, space, cities, parks and scenic areas, and an exterior of the toilet may be connected with a squatting appliance, a sitting appliance, etc. for use.

(8) The composition structures of the toilet are ingeniously designed, so structural performance is optimal, for example, a bottom of the solid storage device uses a screen mesh structure, the solid residue may be supported, and the liquid wastes may conveniently flow to the liquid storage device.

(9) The toilet has high drying efficiency, the solid wastes including toilet paper are chopped and then dispersed in hot air flow of the processor, a contact area of solid and air is large and sufficient, an air drying time is short, and a drying effect is desirable.

(10) The toilet may achieve a secondary drying effect, a position close to a center of the residue entering the solid storage device may be subjected to pouring of liquid discharged by a subsequent toilet user, the hot air flow may be impacted and turned back at the position, "secondary drying" is generated, the process is similar to a process of drying hair, when the solid storage device is nearly full, the solid waste residue can still reach the required dryness where the solid waste residue is not adhered to the wall and is easy to pour out.

(11) A toilet mounting and dismounting tool conforming to human engineering is specially designed, so when an operator operates the tool, the face of the operator keeps a long distance from the solid storage device or the liquid storage device, the operator holds the tool comfortably, and the tool is very convenient to dismount and mount.

BRIEF DESCRIPTION OF THE DRAWINGS

FIG. 7 is a structural schematic diagram of a side lug, a fixing hook and a fixing member in the present disclosure, wherein.

FIG. 8 is a schematic diagram of several end face connection forms of two adjacent devices in the present disclosure, wherein.

FIG. 9 is three views of a mounting tool in the present disclosure, wherein.

DETAILED DESCRIPTION OF THE EMBODIMENTS

The present disclosure will be further described in detail in combination with the accompanying drawings and the specific embodiments.

Figure 1:
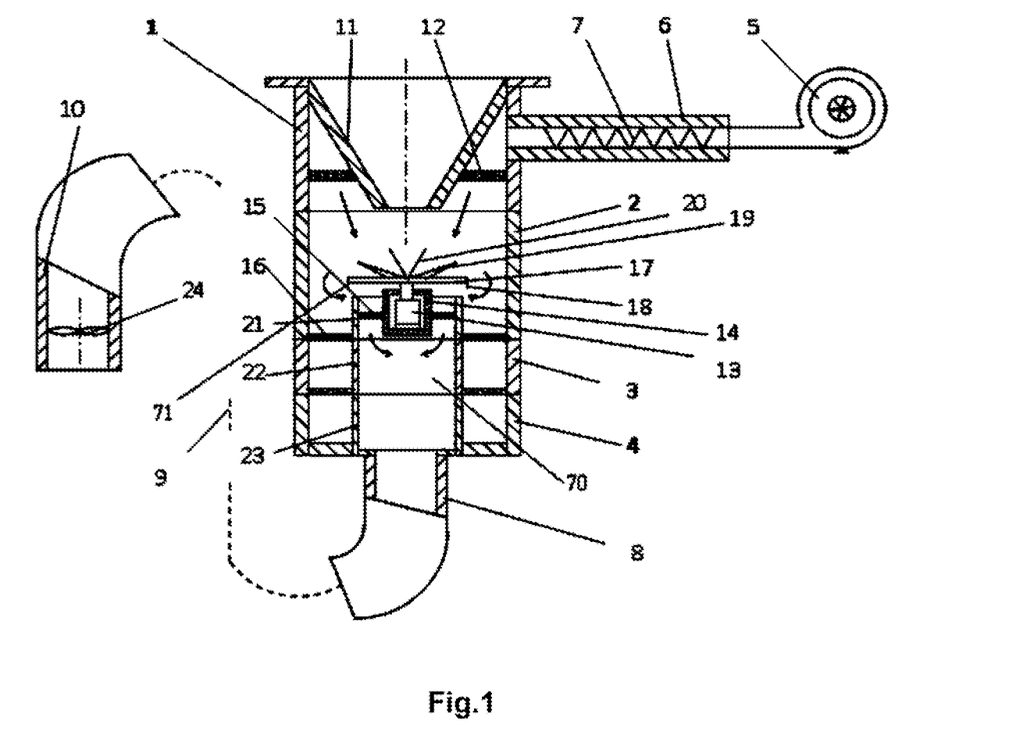
FIG. 1 is a structural schematic diagram of an aerothermodynamic environment-friendly toilet in the present disclosure.

As shown in FIG. 1, a structural schematic diagram of an aerothermodynamic environment-friendly toilet in the present disclosure, the aerothermodynamic environment-friendly toilet includes a receiver 1, a processor 2, a solid storage device 3, a liquid storage device 4 and a drying device, where the receiver 1, the processor 2, the solid storage device 3 and the liquid storage device 4 are sequentially connected from top to bottom, the drying device is in communication with the receiver 1, and all the components may be designed under the ground and may also be designed on the ground, for example, a support and containing space structure may be constructed on the ground, the receiver 1 and the processor 2 are fixed relative to the ground, and the solid storage device 3 and the liquid storage device 4 are movable and may be convenient to collect, take out and place in.

Figure 2:
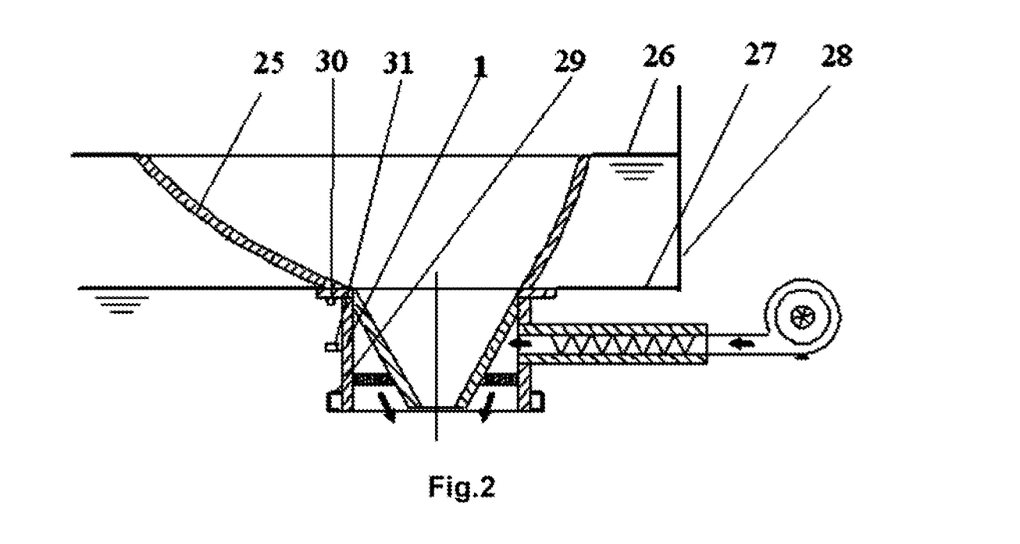
FIG. 2 is a structural schematic diagram of connection between a receiver and a drying device of the aerothermodynamic environment-friendly toilet in the present disclosure.

As shown in FIG. 2, a structural schematic diagram of connection between the receiver and the drying device of the aerothermodynamic environment-friendly toilet in the present disclosure, the aerothermodynamic environment-friendly toilet further includes an appliance connected with the receiver 1 for use of the toilet by a user, for example, the appliance may be a common squatting appliance or sitting appliance. FIG. 2 is an illustration of the squatting appliance or sitting appliance connected with the receiver 1, wherein, 25 represents the squatting appliance or sitting appliance, 26 represents a squatting foot facade, 27 represents a sitting foot facade, and 28 represents a wall. The receiver 1 is connected with the squatting appliance or sitting appliance 25 by an interface flange, the interface flange is preferably fastened and connected by multiple studs and nuts, and a surface gap is sealed by waterproof and heat-proof sealant.

The receiver 1 is of a cavity structure, a reception guider 11 with an inner diameter gradually reduced from top to bottom is arranged in the cavity structure, the reception guider 11 is used for receiving excreta (including solid faeces, toilet paper, liquid urine, etc) after use of the toilet, and a smaller end face of the reception guider 11 may be designed to be equivalent to a throat of a conventional toilet in caliber. In one optional embodiment in the present disclosure, a longitudinal section of the reception guider 11 is a trapezoid, preferably an isosceles trapezoid, and preferably a center line of the reception guider 11 coincides with a center line of a centrifugal rotary disc 17 of a crushing mechanism of the processor 2, so the excreta may fall right above the crushing mechanism. An annular porous plate 12 is arranged between an outer wall of the reception guider 11 and an inner wall of the cavity structure, and holes in the annular porous plate 12 are uniform holes or non-uniform holes. A hole is provided in a side wall of the cavity structure of the receiver 1 and is in communication with an outlet of the drying device, the outlet of the drying device is located on an upper portion of the annular porous plate 12, and the annular porous plate 12 has throttling and guiding effects, such that hot air flow generated by the drying device flows downwards.

The drying device includes a fan 5, a hot air supply pipe 6 and an air heater 7, the air heater 7 being arranged in the hot air supply pipe 6, the fan 5 being in communication with the hot air supply pipe 6, and the air heater 7 generating hot air flow which is sent into the receiver 1 by the fan 5.

Figure 3:
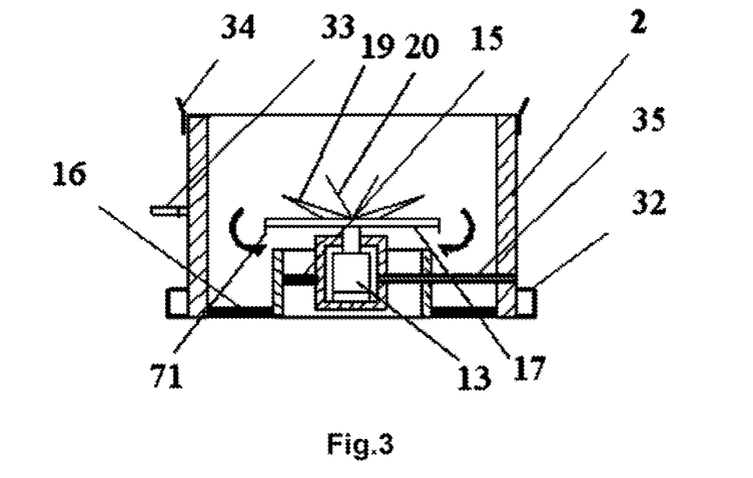
FIG. 3 is a structural schematic diagram of a processor of the aerothermodynamic environment-friendly toilet in the present disclosure.

As shown in FIG. 3, a structural schematic diagram of the processor of the aerothermodynamic environment-friendly toilet in the present disclosure, the processor 2 is of a cavity structure matching the receiver 1 in shape, the crushing mechanism is arranged therein and includes an electric motor 13, a centrifugal rotary disc 17 and a cutting member, the cutting member being arranged on the centrifugal rotating disc 17, the centrifugal rotary disc 17 being connected with the electric motor 13, and the centrifugal rotary disc 17 being located above a hot air flow channel 70, and a size of the centrifugal rotary disc 17 is designed to at least completely cover an inlet of the hot air flow channel 70, such that liquid and solid in the excreta do not fall into the hot air flow channel 70 after passing through the centrifugal rotary disc 17. Preferably, an annular baffle 71 (similar to a short skirt edge) is arranged on an edge of the centrifugal rotary disc 17, an included angle between a generatrix of the annular baffle 71 and a plane of the centrifugal rotary disc 17 is 30°-150°, preferably 90°, and the annular baffle 71 may be formed by bending the edge of the centrifugal rotary disc 17 downwards or may be independently arranged to guide the liquid waste downwards and prevent the solid waste and the liquid waste from entering the downward hot air flow channel 70. The electric motor 13 is connected with the centrifugal rotary disc 17 by a rotating shaft, the cutting member includes a cutting cutter 19 and a wire cutter 20, preferably two cutting cutters 19 and two wire cutters 20, an external housing of the electric motor 13 protects the electric motor 13, the electric motor 13 is connected with an external power supply by an electric motor wire leading-out pipe 35, a second fixing rod 15 is arranged between the electric motor housing and an inner wall of the hot air flow channel 70 for connection and fixation, and a first fixing rod 16 is arranged between an outer wall of the hot air flow channel 70 and an inner wall of the cavity structure of the processor 2 for connection and fixation. The centrifugal rotary disc 17 may be made of metal such as stainless steel, copper, aluminum, and iron subjected to anti-corrosion treatment on a surface or hard plastic, and preferably aluminum and hard plastic which are low in cost and easy to machine.

Figure 4:
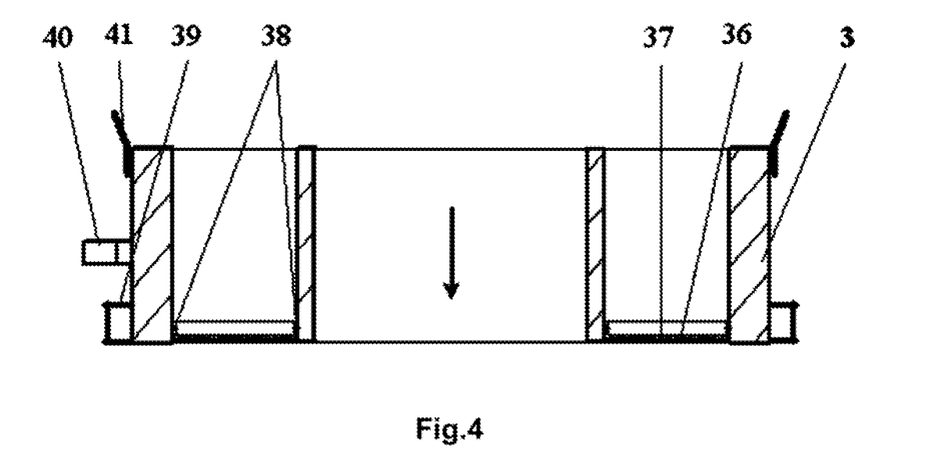
FIG. 4 is a structural schematic diagram of a solid storage device of the aerothermodynamic environment-friendly toilet in the present disclosure.
Figure 5:
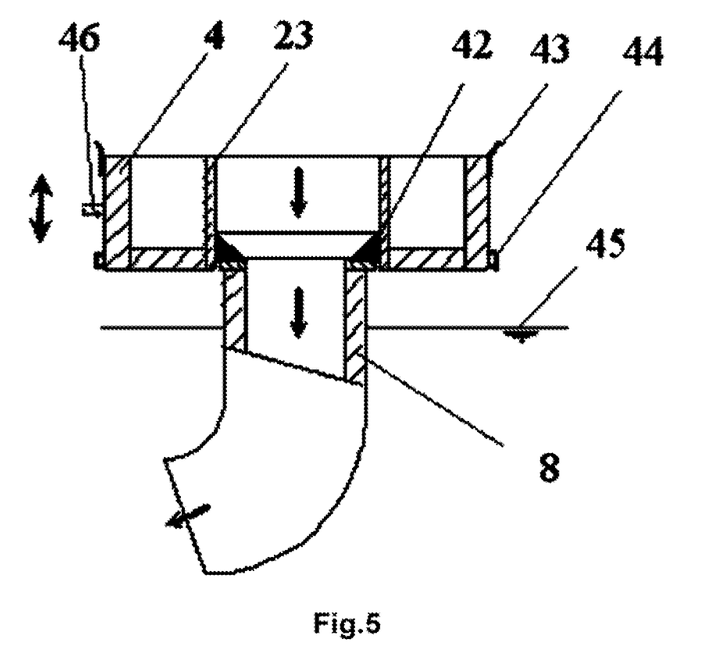
FIG. 5 is a structural schematic diagram of a liquid storage device of the aerothermodynamic environment-friendly toilet in the present disclosure.

As shown in FIG. 4, a structural schematic diagram of the solid storage device of the aerothermodynamic environment-friendly toilet in the present disclosure, and FIG. 5, a structural schematic diagram of the liquid storage device of the aerothermodynamic environment-friendly toilet in the present disclosure, the solid storage device 3 and the liquid storage device 4 are of annular cavity structures matching in shape, and hot air flow channels are formed therein and are in communication with the hot air flow channel formed in the processor 2, so as to form a complete hot air flow channel 70. A third fixing rod 36 is arranged between an inner wall of the cavity structure of the solid storage device 3 and the outer wall of the hot air flow channel, a through hole is provided in a bottom of an annular cavity of the solid storage device 3 and used for allowing liquid to pass through, for example, a pore plate with more through holes or a support rod and silk screen structure may be used, as shown in FIG. 4, preferably, the support rod and silk screen structure is used, an annular screen 37 with inner and outer vertical edge has a hole diameter of 0.5-1.5 mm, after the inner vertical edge and the outer vertical edge of the screen 37 are attached to an inner barrel and an outer barrel respectively, spot welding 38 fixing at multiple points evenly distributed in a circumferential direction may be conducted by a spot welding machine, and a bottom of an annular cavity of the liquid storage device 4 is of a closed structure.

As shown in FIG. 5, the bottom of the liquid storage device 4 is movably connected with an annular rubber ring 42 identical to an inner diameter of the hot air flow channel 70 by a caliber, the annular rubber ring 42 is bonded and fixed to an upper flange of the air outlet 8, such that an inner barrel 23 of the liquid storage device 4 and the air outlet 8 may move relatively and have an air flow sealing function, and the annular rubber ring 42 is preferably an annular rubber ring with a triangular section.

Figure 7A:
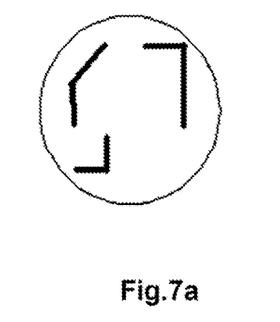
FIG. 7*a* is a schematic diagram of the fixing hook.
Figure 7B:
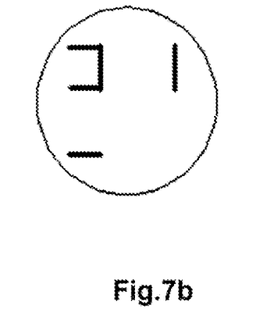
FIG. 7*b* is a schematic diagram of the side lug.
Figure 7C:
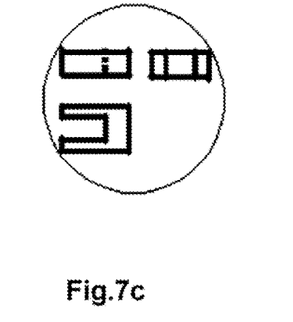
FIG. 7*c* is a schematic diagram of the fixing member.

In addition, each of the receiver 1, the processor 2, the solid storage device 3 and the liquid storage device 4 is provided with a connector. As shown in FIG. 2, an outer wall of the cavity structure of the receiver 1 is provided with a side lug 29, a fixing member 31 and a locking rod hinge hole 30. As shown in FIG. 3, an outer wall of the cavity structure of the processor 2 is provided with a side lug 32, a fixing hook 34 and a fixing member 33. As shown in FIG. 4, an outer wall of the cavity structure of the solid storage device 3 is provided with a side lug 39, a fixing hook 41 and a fixing member 40. As shown in FIG. 5, an outer wall of the cavity structure of the liquid storage device 4 is provided with a side lug 44, a fixing hook 43 and a fixing member 46. In an optional embodiment in the present disclosure, the side lug is semi-I-shaped, and two to four side lugs are uniformly distributed in a circumferential direction of the device; the fixing hook is of a bent structure, is shaped like "7" and is connected with the side lug in a circumferential rotating and hooking manner, that is, in two connected devices, the fixing hook of one device is connected with the corresponding side lug of the other device; two to four fixing hooks are uniformly distributed in the circumferential direction of the device; and a fixing groove is provided in the fixing member and used for being clamped into a locking rod 47 connected with the locking rod hinge hole in a hinged mode so as to circumferentially locked the receiver 1, the processor 2, the solid storage device 3 and the liquid storage device 4. FIG. 7 is a structural schematic diagram of a side lug, a fixing hook and a fixing member in the present disclosure, wherein, FIG. 7a is three views of the fixing hook, FIG. 7b is three views of the side lug, and FIG. 7c is three views of the fixing member.

Figure 6:
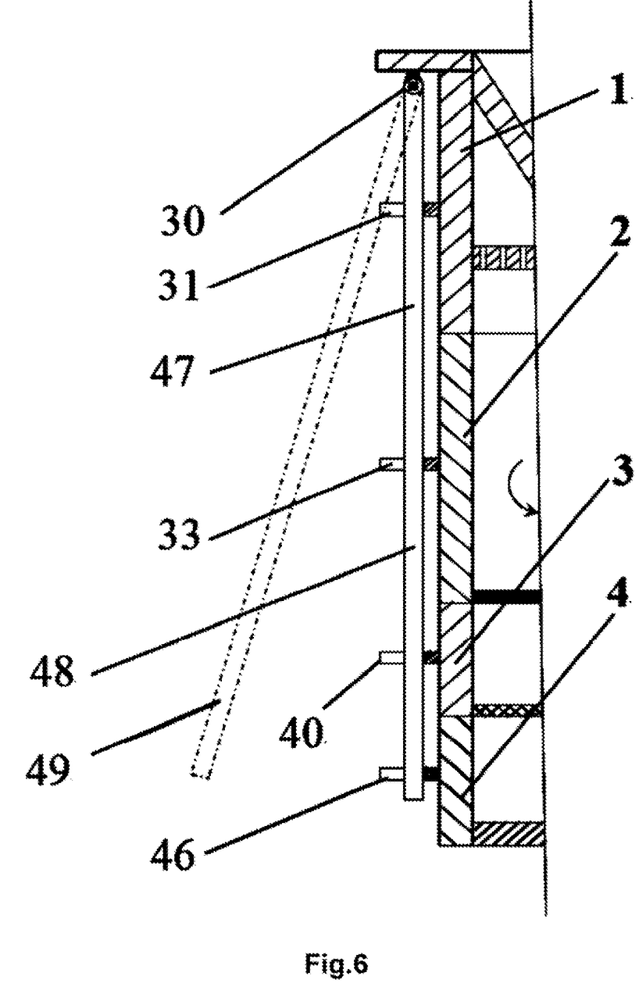
FIG. 6 is a schematic diagram of states of locking and unlocking the receiver, the processor, the solid storage device, and the liquid storage device by a locking device in the present disclosure.

As shown in FIG. 6 is a schematic diagram of states of locking and unlocking the receiver 1, the processor 2, the solid storage device 3, and the liquid storage device 4 by a locking device in the present disclosure, the locking device includes a locking rod 47 and several fixing members. In one optional embodiment of the present disclosure, four fixing member are separately mounted on the receiver 1, the processor 2, the solid storage device 3 and the liquid storage device 4, each fixing member is provided with a fixing groove for matching the locking rod 47 to lock the toilet, a locking position is 48, an unlocking position is 49, an end of the locking rod 47 matches a double-piece hinge hole of a flange by a flattening drill hole, and hinge connection is achieved by a screw penetrating a matched nut.

Figure 8A:
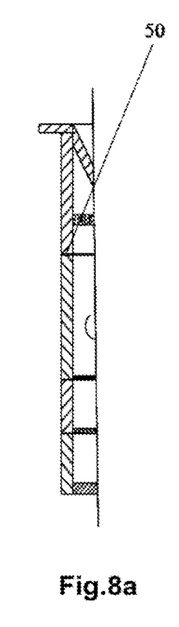
FIG. 8*a* is an illustration of a flat interface of two adjacent devices.
Figure 8B:
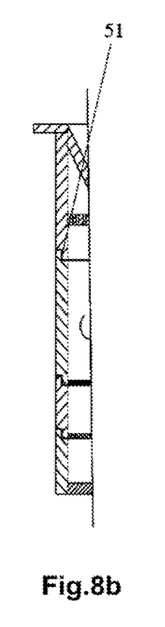
FIG. 8*b* is an illustration of an outer-inner clamping interface of two adjacent devices.
Figure 8C:
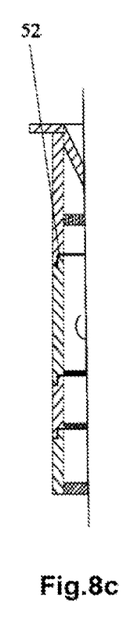
FIG. 8*c* is an illustration of an inner-outer clamping interface of two adjacent devices.
Figure 8D:
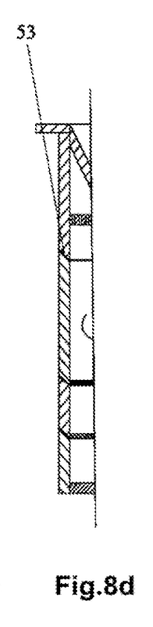
FIG. 8*d* is an illustration of an outer-inner cone interface of two adjacent devices.
Figure 8E:
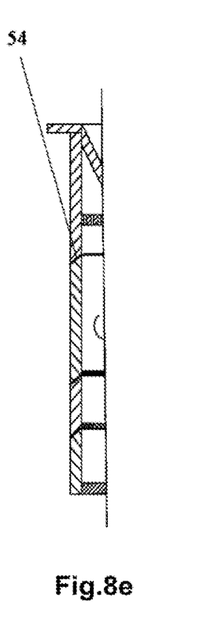
FIG. 8*e* is an illustration of an inner-outer cone interface of two adjacent devices.

FIG. 8 is a schematic diagram of several end face connection forms of two adjacent devices in the present disclosure, wherein, FIG. 8a is an illustration of a flat interface 50 of two adjacent devices, FIG. 8b is an illustration of an outer-inner clamping interface 51 of two adjacent devices, FIG. 8c is an illustration of an inner-outer clamping interface 52 of two adjacent devices, FIG. 8d is an illustration of an outer-inner cone interface 53 of two adjacent devices, and FIG. 8e is an illustration of an inner-outer cone interface 54 of two adjacent devices. Preferably, the connection form of the outer-inner clamping interface 51 or the inner-outer clamping interface 52 is used, which has better sealing performance.

The receiver 1 is fixedly or movably connected with the processor 2, for example, the fixed connection may be detachable reinforced fastening connection, an upper device and a lower device are provided with interface matching flanges, and bolts and nuts are additionally arranged for locking and fixing, so as to eliminate tiny vibration influence during electric motor work, and the movable connection may be simple and convenient hooking movable connection, the simple and convenient hooking movable connection may be used between the processor 2 and the solid storage device 3 and between the solid storage device 3 and the liquid storage device 4, a locking rod is matched, so as to lock all connecting parts.

The toilet further includes a trigger button and a time relay, wherein, the time relay is connected with the trigger button to achieve delay control, and the trigger button may be arranged on the toilet body or separated from the toilet body, so that the trigger button may be pressed conveniently after use of the toilet. The trigger button is pressed after use of the toilet, the drying device and the crushing mechanism are started at fixed time to quickly dry and crush solids in excreta and then store fertilizer, starting and stopping waste treatment for once may be completed only in 10-20 seconds, next use of the toilet is not influenced, the drying device and the crushing mechanism may be started simultaneously, or the drying device may be controlled to be started first, hot air is firstly generated and sent out, and then the crushing mechanism is started. The time relay, the drying device and the electric motor may be connected with a same power supply, so as to simplify the structure.

A working process of the toilet of the present disclosure is as follows:

After use of the toilet, a trigger button is pressed to start a drying device and a crushing mechanism, hot air flow generated by the drying device enters a processor 2 by a receiver 1, and an annular space at a bottom of a centrifugal rotary disc 17 and a top of an air duct wall of the processor 2 is an outlet (annular) for the drying hot air flow, excreta, including solid waste (faeces, toilet paper, etc.) and liquid waste (urine, etc.), generated after use of the toilet fall to the crushing mechanism in the processor 2 by the receiver 1, liquid in the excreta directly penetrates a screen at a bottom of a solid storage device 3 and enters a liquid storage device 4, solid in the excreta is dried by the hot air flow and crushed by the crushing mechanism and then enters the solid storage device 3, most of hot air flow (90% or more) directly enters a hot air flow channel, the other small amount of hot air flow passes through the solid storage device 3, reaches a closed surface of the bottom of the liquid storage device 4, returns to the processor 2, continues to dry the solid in the excreta, that is, "secondary drying" (which is similar to a hair drying process of an electric hair drier), and then enters the hot air flow channel as well, the hot air flow passes through an air outlet 8 at a tail end of the hot air flow channel and a connection pipeline 9 (or a through-wall air duct) to enter an exhaust port 10 and is discharged outwards under the action of an exhaust fan 24.

Figure 9A:
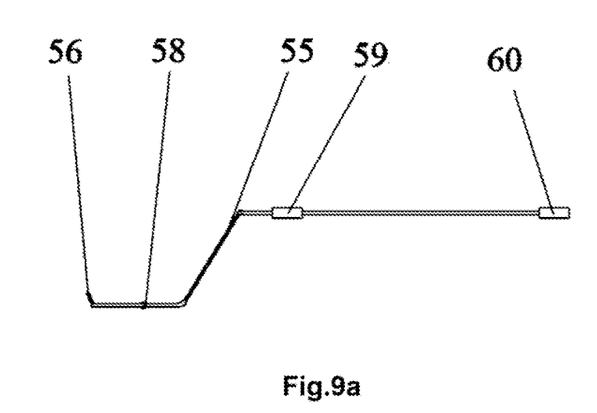
FIG. 9*a* is a front view.
Figure 9B:
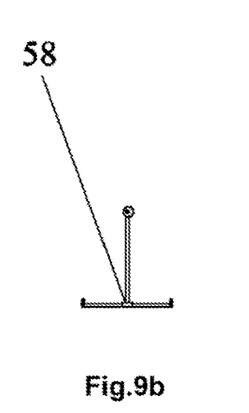
FIG. 9*b* is a side view.
Figure 9C:
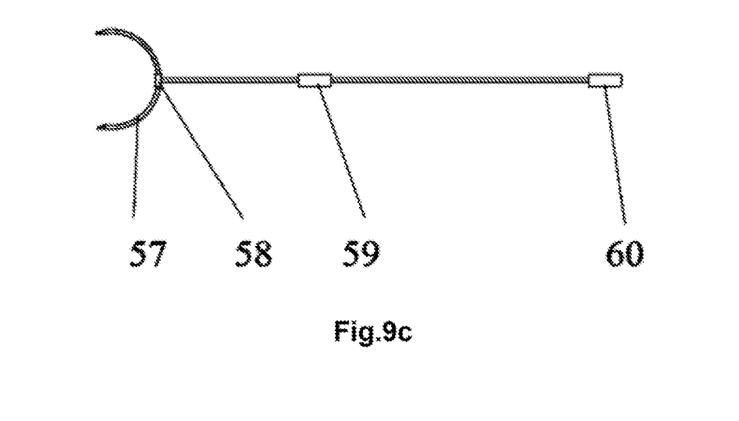
FIG. 9*c* is a top view.

Components of the processor 2, the solid storage device 3 and the liquid storage device 4 of the toilet, especially the solid storage device 3 and the liquid storage device 4 are mounted and dismounted by a mounting tool shown in FIG. 9, mounting or dismounting is more convenient, and the solid storage device 3 and the liquid storage device 4 are kept at a certain distance from an operator. FIG. 9 shows three views of the specially designed mounting/dismounting tool for the toilet in the present disclosure, wherein, FIG. 9a is a front view, FIG. 9b is a side view, and FIG. 9c is a top view. The mounting tool includes a rod body 55, a hoop 57 and at least one handle 59, the hoop 57 being arranged at one end of the rod body 55, the handle 59 being arranged at the other end and/or between the two ends of the rod body 55, the hoop 57 being of a cambered structure, each of two ends of the hoop being provided with an upwarping hook 56, the hoop 57 matching a device body, and the upwarping hook 56 matching the side lug of the device. The rod body 55 is of a rigid double-bent structure and may match the toilet under the ground for mounting or dismounting, a length may be adjusted and designed according to a position of the specific toilet, under the condition that the toilet is on the ground, the double-bent structure may be removed to form a straight rod, the upwarping hook 56 is arranged at a front end of the hoop 57, the rod body 55 is connected with the hoop 57 by a connecting pair 58, the connecting pair 58 is of a T-shaped structure and used for fixing between the rod body 55 and the hoop 57 and increasing strength. In one optional embodiment of the present disclosure, two handles are provided, the first handle 59 and the second handle 60 are holding positions of two hands of an operator, the hoop 57 matches a body of the solid storage device 3 or the liquid storage device 4, and a radius of the hoop 57 is slightly larger than that of a held object.

In a mounting method for the aerothermodynamic environment-friendly toilet in the present disclosure, a mounting sequence is as follows:

A receiver 1 is connected with an appliance for use of a toilet, and an interface is sealed;
    a tool as shown in FIG. 9 is held with two hands to extend two upwarping hooks 56 into two semi-I-shaped side lugs 44 of a liquid storage device 4, a connecting pair 58 is clamped on a fixing member 46, the liquid storage device 4 is supported to be aligned to a fixed air outlet and moves downwards to complete connection between the liquid storage device 4 and the air outlet;

similarly, the tool as shown in FIG. 9 is held with two hands to support a processor 2 to be aligned to the receiver 1, the processor 2 is rotated slightly so as to make a fixing hook 34 "hook" a corresponding side lug 29, and the processor 2 is connected with the receiver 1;

similarly, the tool as shown in FIG. 9 is held with two hands to connect the solid storage device 3 to the processor 2;

similarly, the tool as shown in FIG. 9 is held with two hands to move the liquid storage device 4 upwards by slight rotation to be connected with the solid storage device 3, although the liquid storage device 4 moves upwards, the liquid storage device 4 is kept in sealed movable connection to the air outlet 8;

and a locking device is used for locking and fixing the receiver 1, the processor 2, the solid storage device 3 and the liquid storage device 4 that are mounted.

The specific mounting process includes:

(1) A receiver 1 is connected with a traditional squatting or sitting toilet 25 according to a manner shown in FIG. 2, an interface flange is recommended to use multi-stud connection, and a surface gap is sealed by waterproof and heat-proof sealant.

(2) A mounting tool as shown in FIG. 9 is held to insert two upwarping hooks 56 at a front end into two semi-I-shaped side lugs 44 as shown in FIG. 5, a connecting pair 58 clamps a fixing member 46 of a receiver, and the hoop 57 clamps an outer side wall of the liquid storage device 4.

(3) A handle 59 is held to support the liquid storage device 4 to be aligned with and downwards placed into an air outlet 8 fixed to the ground or a fixing frame 45, connection of the liquid storage device 4 and the air outlet 8 is achieved, and an upper mounting space is reserved.

(4) A mounting tool as shown in FIG. 9 is held to insert two upwarping hooks 56 at a front end into two semi-I-shaped side lugs 32 as shown in FIG. 3, a connecting pair 58 clamps a fixing member 33 of a receiver, and the hoop 57 clamps an outer side wall of a barrel wall of the processor 2.

(5) The handle 59 is held to support the processor 2 to be aligned with and make contact with a bottom of the receiver 1, and the processor 2 is rotated to make a 7-shaped fixing hook 34 hook a semi-I-shaped side lug 29.

(6) Similar to step (3), the handle 59 is held to support a solid storage device 3 to be aligned with and make contact with a bottom of the processor 2, and the solid storage device 3 is rotated to make a 7-shaped fixing hook 41 hook a semi-I-shaped side lug 32.

(7) Similar to steps (3) and (4), the handle 59 is held to support the liquid storage device 4 to be aligned with and make contact with a bottom of the solid storage device 3, and the liquid storage device 4 is rotated to make a 7-shaped fixing hook 43 hook a semi-I-shaped side lug 39.

(8) The mounting tool as shown in FIG. 9 is taken down, and a locking rod 47 as shown in FIG. 6 is rotated along a hinge hole 30 from an unlocking position 49 to a locking position 48, thereby completing mounting of the entire toilet.

Figure 10:
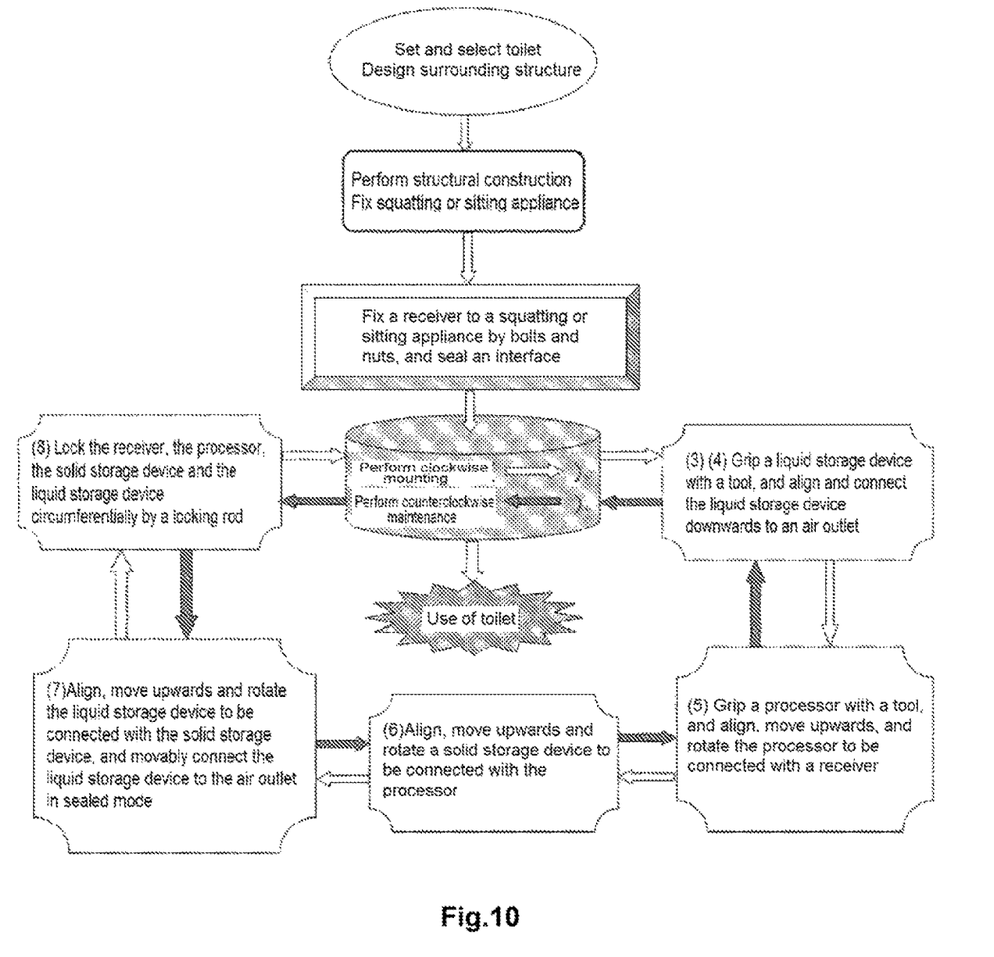
FIG. 10 is a flow diagram of mounting the aerothermodynamic environment-friendly toilet in the present disclosure.

(9) After a certain time of use of the toilet, when the solid storage device 3 or the liquid storage device 4 is close to full, dismounting operation is started, the solid storage device 3 or the liquid storage device 4 is taken out in a sequence opposite steps (8), (7), (6), (5), (4) and (3), fertilizer therein is poured out, and the solid storage device 3 or the liquid storage device 4 are mounted and used again according to a sequence of (3), (4), (5), (6), (7) and (8). FIG. 10 is a flow diagram of mounting of the aerothermodynamic environment-friendly toilet in the present disclosure.

(10) After certain time, all the components and the whole body are cleaned, and periodic maintenance is achieved.

In the toilet, when no one uses the toilet, a fan at an exhaust port is used for exhausting a small amount of air from each cavity of the toilet to control an odor source unidirectionally; and after use of the toilet, a waste treatment button is triggered, then hot air flow moves downwards, which ejects air at an upper portion of a lower conical port of the receiver, so as to control the odor source unidirectionally likewise, and a requirement for odorlessness is met.

The foregoing description, merely being optimal embodiments of the present disclosure, is not intended to limit the scope of protection of the present disclosure, and any changes or substitutions, that may readily occur to those skilled in the art, within the scope of technology disclosed in the present disclosure are intended to be encompassed within the scope of protection of the present disclosure.

The content of the present disclosure not described in detail in this specification belongs to the state of the art well known to those skilled in the art.

What is claimed is:

1. An aerothermodynamic environment-friendly toilet, comprising a receiver, a processor, a solid storage device, a liquid storage device and a drying device, wherein the receiver, the processor, the solid storage device and the liquid storage device are sequentially connected, a crushing mechanism is arranged in the processor, the drying device is in communication with the receiver, generated hot air flow enters the processor by the receiver, after use of the toilet by a user, excreta falls to the crushing mechanism in the processor by the receiver, liquid in the excreta directly passes through the solid storage device to enter the liquid storage device, solid in the excreta is dried by hot air flow and crushed by the crushing mechanism and then enters the solid storage device, and hot air flow enters a hot air flow channel and is discharged outwards by an air outlet at a tail end of the hot air flow channel;

wherein the crushing mechanism is arranged in the processor and comprises an electric motor, a centrifugal rotary disc, and a cutting member, wherein the cutting member is arranged on the centrifugal rotary disc, a shaft of the centrifugal rotary disc is connected with the electric motor, the centrifugal rotary disc is located above the hot air flow channel, and a size of the centrifugal rotating disc is designed to completely cover an inlet of the hot air flow channel;

an annular baffle is arranged on an edge of the centrifugal rotary disc.

2. The aerothermodynamic environment-friendly toilet as claimed in claim 1, further comprising an appliance connected with the receiver for use of the toilet by the user, wherein the appliance comprises a squatting appliance or a sitting appliance.

3. The aerothermodynamic environment-friendly toilet as claimed in claim 1, wherein the receiver is a cavity structure, a reception guider with an inner diameter gradually reduced from top to bottom is arranged in the cavity structure, the reception guider is used for receiving the excreta, and an annular porous plate is arranged between an outer wall of the reception guider and an inner wall of the cavity structure.

4. The aerothermodynamic environment-friendly toilet as claimed in claim 3, wherein a longitudinal section of the reception guider is of trapezoidal, and a center line of the reception guider coincides with a center line of a centrifugal rotary disc in the crushing mechanism.

5. The aerothermodynamic environment-friendly toilet as claimed in claim 3, wherein an outlet of the drying device is located on an upper portion of the annular porous plate, and the annular porous plate has throttling and guiding effects, such that hot air flow generated by the drying device flows downwards.

6. The aerothermodynamic environment-friendly toilet as claimed in claim 1, wherein an included angle between a generatrix of the annular baffle and a plane of the centrifugal rotary disc is 30-150°; and the cutting member comprises a cutting cutter and a wire cutter.

7. The aerothermodynamic environment-friendly toilet as claimed in claim 1, wherein a first fixing rod is arranged between an inner wall of a cavity structure of the processor and an outer wall defining the hot air flow channel, a second fixing rod is arranged between the electric motor and an inner wall defining the hot air flow channel, and a third fixing rod is arranged between an inner wall of a cavity structure of the solid storage device and an outer wall of the hot air flow channel.

8. The aerothermodynamic environment-friendly toilet as claimed in claim 1, wherein the solid storage device and the liquid storage device are of annular cavity structures matching in shape, and hot air flow channels are formed in the annular cavity structures and are in communication with a hot air flow channel formed in the processor, so as to form a complete hot air flow channel.

9. The aerothermodynamic environment-friendly toilet as claimed in claim 1, wherein a through hole is provided in a bottom of an annular cavity of the solid storage device and configured to allow liquid to pass through, and a bottom of an annular cavity of the liquid storage device is a closed structure.

10. The aerothermodynamic environment-friendly toilet as claimed in claim 1, wherein the drying device comprises a fan, a hot air supply pipe and an air heater, the air heater being arranged in the hot air supply pipe, and the fan being in communication with the hot air supply pipe.

11. The aerothermodynamic environment-friendly toilet as claimed in claim 1, further comprising a trigger button, wherein after use of the toilet by the user, the trigger button is pressed to start the drying device and the crushing mechanism to dry and crush solids of the excreta; and the aerothermodynamic environment-friendly toilet further comprises a time relay, wherein the time relay is connected with the trigger button to achieve delay control.

12. The aerothermodynamic environment-friendly toilet as claimed in claim 1, further comprising a locking device, wherein the locking device is configured to circumferentially lock and fix the receiver, the processor, the solid storage device and the liquid storage device that are mounted.

13. The aerothermodynamic environment-friendly toilet as claimed in claim 12,
wherein the locking device comprises a locking rod and a plurality of fixing members, the plurality of fixing members being mounted on the receiver, the processor, the solid storage device and the liquid storage device respectively, and a fixing groove is provided in each of the plurality of fixing members and configured to match the locking rod to circumferentially lock the toilet.

14. The aerothermodynamic environment-friendly toilet as claimed in claim 1, wherein the receiver is fixedly or movably connected with the processor, the processor is movably connected with the solid storage device, and the solid storage device is movably connected with the liquid storage device.

15. The aerothermodynamic environment-friendly toilet as claimed in claim 14, wherein a movable connection device used comprises a side lug and a fixing hook, and in two connected devices, the fixing hook of one device is connected with the side lug of the other device in a hooking mode.

16. The aerothermodynamic environment-friendly toilet as claimed in claim 1, wherein end faces of the receiver, the processor, the solid storage device and the liquid storage device are connected with each other in a form of a flat interface, an outer-inner clamping interface, an inner-outer clamping interface, an outer-inner cone interface or an inner-outer cone interface.

17. The aerothermodynamic environment-friendly toilet as claimed in claim 1, wherein the receiver, the processor, the solid storage device and the liquid storage device are integrally arranged on or under the ground; and the air outlet is in communication with an exhaust port by a pipeline, and an exhaust fan is mounted at an outlet of the exhaust port.

18. A mounting method for the aerothermodynamic environment-friendly toilet as claimed in claim 1, comprising:
connecting a receiver with an appliance for use of a toilet by a user, and sealing an interface;
connecting a liquid storage device with an air outlet fixedly arranged;
connecting a processor with the receiver;
connecting a solid storage device with the processor;
connecting the liquid storage device with the solid storage device; and
using a locking device to lock and fix the receiver, the processor, the solid storage device and the liquid storage device that are mounted.

19. The mounting method for the aerothermodynamic environment-friendly toilet as claimed in claim 18, wherein a mounting tool is used for connecting/disconnecting the liquid storage device with/from the fixed air outlet, the processor with/from the receiver, the solid storage device with/from the processor, and the liquid storage device with/from the solid storage device; and the mounting tool comprises a rod body, a hoop and at least one handle, the hoop being arranged at one end of the rod body, the handle being arranged at the other end of the rod body and/or between two ends, the hoop being of a cambered structure, each of two ends of the hoop being provided with an upwarping hook, the hoop matching a device body, and the upwarping hook matching a side lug of the device; and the rod body is a bent structure or a linear structure, the rod body is connected with the hoop by a connecting pair, and the connecting pair is of a T-shaped structure and used for fixing between the rod body and the hoop and increasing strength.

* * * * *